(12) United States Patent
Phule et al.

(10) Patent No.: US 11,242,023 B2
(45) Date of Patent: Feb. 8, 2022

(54) DRIVER KNEE BLOCKER ENERGY ABSORPTION SYSTEM

(71) Applicants: Tushar M Phule, Auburn Hills, MI (US); Chris Sleiman, Windsor (CA); Scott E Zilincik, Troy, MI (US); Jeffrey P Stasevich, Rochester Hills, MI (US); Joseph L Arnone, Macomb Township, MI (US); Atul V Deo, Sterling Heights, MI (US)

(72) Inventors: Tushar M Phule, Auburn Hills, MI (US); Chris Sleiman, Windsor (CA); Scott E Zilincik, Troy, MI (US); Jeffrey P Stasevich, Rochester Hills, MI (US); Joseph L Arnone, Macomb Township, MI (US); Atul V Deo, Sterling Heights, MI (US)

(73) Assignee: FCA US LLC, Auburn Hills, MI (US)

( * ) Notice: Subject to any disclaimer, the term of this patent is extended or adjusted under 35 U.S.C. 154(b) by 56 days.

(21) Appl. No.: 16/717,139

(22) Filed: Dec. 17, 2019

(65) Prior Publication Data

US 2020/0223386 A1 Jul. 16, 2020

Related U.S. Application Data

(60) Provisional application No. 62/791,295, filed on Jan. 11, 2019.

(51) Int. Cl.
*B60R 21/055* (2006.01)
*B60R 21/00* (2006.01)

(52) U.S. Cl.
CPC ............ *B60R 21/055* (2013.01); *B60R 21/00* (2013.01); *B60R 2021/0051* (2013.01)

(58) Field of Classification Search
CPC .................. B60R 21/055; B60R 21/00; B60R 2021/0051; B60R 21/045
See application file for complete search history.

(56) References Cited

U.S. PATENT DOCUMENTS

| 4,853,270 A | 8/1989 | Wycech |
| 5,518,270 A * | 5/1996 | Hanada ................. B60R 21/045 280/748 |
| 6,145,880 A | 11/2000 | White et al. |

(Continued)

FOREIGN PATENT DOCUMENTS

KR 20040087011 A * 10/2004

*Primary Examiner* — Paul N Dickson
*Assistant Examiner* — Kurtis Nielson
(74) *Attorney, Agent, or Firm* — Ralph E. Smith

(57) ABSTRACT

A tunable knee blocker energy absorption system for a vehicle having an instrument panel, a structural cross-car member, and an occupant protection device includes a left energy absorption (EA) bracket configured to couple to the structural cross-car member and including a left lower EA bracket, a left upper EA bracket, and a left EA bridge. A right EA bracket is configured to couple to the structural cross-car member and includes a right lower EA bracket and a right upper EA bracket. The left EA bracket and the right EA bracket are distinct from each other to manage a non-uniform load path of occupant femurs into the instrument panel and alter the kinematic response of the occupant back to a uniform presentation to the occupant protection device.

18 Claims, 2 Drawing Sheets

(56) References Cited

U.S. PATENT DOCUMENTS

| | | | |
|---|---|---|---|
| 6,302,477 B1* | 10/2001 | Satou | B60R 13/0206 |
| | | | 280/751 |
| 6,783,156 B2 | 8/2004 | Chickmenahalli et al. | |
| 7,318,873 B2 | 1/2008 | Czaplicki et al. | |
| 7,393,013 B2 | 7/2008 | Best et al. | |
| 7,735,865 B2 | 6/2010 | Cappabianca et al. | |
| 8,356,836 B2 | 1/2013 | Taracko | |
| 8,764,102 B2* | 7/2014 | Abe | B62D 25/145 |
| | | | 296/193.02 |
| 2003/0071448 A1* | 4/2003 | Shimoyamada | B60R 21/045 |
| | | | 280/752 |
| 2006/0061199 A1* | 3/2006 | Kong | B60R 21/045 |
| | | | 297/466 |
| 2007/0164548 A1* | 7/2007 | Abe | B60R 21/04 |
| | | | 280/752 |
| 2007/0222197 A1* | 9/2007 | Makita | B60R 21/05 |
| | | | 280/752 |
| 2008/0048425 A1* | 2/2008 | Hayata | B60R 21/045 |
| | | | 280/751 |
| 2009/0146405 A1* | 6/2009 | Kawashima | B60R 21/045 |
| | | | 280/751 |
| 2012/0068447 A1* | 3/2012 | An | B60R 21/045 |
| | | | 280/752 |
| 2013/0249201 A1* | 9/2013 | Fujiwara | B60R 21/045 |
| | | | 280/752 |
| 2013/0320652 A1* | 12/2013 | Strunk | B60R 21/045 |
| | | | 280/728.3 |
| 2016/0082913 A1* | 3/2016 | Tamada | B60R 21/055 |
| | | | 280/752 |
| 2016/0229365 A1* | 8/2016 | Abe | B62D 25/145 |
| 2017/0001589 A1* | 1/2017 | An | B32B 5/024 |
| 2017/0274857 A1* | 9/2017 | An | B60R 21/045 |
| 2018/0022302 A1* | 1/2018 | An | B60R 21/045 |
| | | | 280/751 |
| 2018/0029555 A1* | 2/2018 | Gewert | B60R 21/045 |
| 2019/0367097 A1* | 12/2019 | Roux | B23K 26/0624 |
| 2020/0130628 A1* | 4/2020 | Zeng | B60R 21/045 |

* cited by examiner

DRIVER KNEE BLOCKER ENERGY ABSORPTION SYSTEM

CROSS-REFERENCE TO RELATED APPLICATION(S)

The present application claims the benefit of U.S. Provisional Application No. 62/791,295, filed on Jan. 11, 2019. The disclosure of the above-identified application is incorporated herein by reference in its entirety.

FIELD

The present application relates generally to passenger vehicle safety systems and, more particularly, to a knee blocker energy absorption system for a passenger vehicle.

BACKGROUND

Some vehicles include an instrument panel with a knee blocker assembly configured to absorb a potential impact of a driver's knees during a possible frontal impact event. These typical knee blocker assemblies, however, are not tunable for different force-displacement load responses. Thus, while such knee blocker assemblies work well for their intended purpose, there remains a desire for improvement in the relevant art.

SUMMARY

In accordance with one example aspect of the invention, a tunable knee blocker energy absorption system for a vehicle having an instrument panel, a structural cross-car member, and an occupant protection device is provided. In one example implementation, the tunable knee blocker energy absorption system includes a left energy absorption (EA) bracket configured to couple to the structural cross-car member and including a left lower EA bracket, a left upper EA bracket, and a left EA bridge. A right EA bracket is configured to couple to the structural cross-car member and includes a right lower EA bracket and a right upper EA bracket. The left EA bracket and the right EA bracket are distinct from each other to manage a non-uniform load path of occupant femurs into the instrument panel and alter the kinematic response of the occupant back to a uniform presentation to the occupant protection device.

In addition to the foregoing, the described tunable knee blocker energy absorption system may include one or more of the following features: wherein the left lower EA bracket includes a first end configured to couple to the structural cross-car member, and a second end configured to couple to at least one of the left upper EA bracket and the left EA bridge; wherein the left lower EA bracket further includes a main body having opposed sides with flanges extending outwardly therefrom, the flanges configured to provide structural rigidity and additional energy absorption capability, wherein the flanges include a tunable width to at least partially provide a desired force-displacement femur load response; and wherein the left lower EA bracket main body includes one or more holes formed therein, wherein a size and shape of the one or more holes are tunable to further provide the desired force-displacement femur load response.

In addition to the foregoing, the described tunable knee blocker energy absorption system may include one or more of the following features: wherein the left lower EA bracket is generally U-shaped and includes a forward longitudinal portion and a rearward angled portion connected by a lateral portion; wherein a first corner radius is defined between the forward longitudinal portion and the lateral portion, and a second corner radius is defined between the rearward angled portion and the lateral portion, wherein the first and second corner radii are tunable to at least partially provide a desired force-displacement femur load response; wherein the rearward angled portion defines a contact surface configured to be contacted by the occupant's left knee during an impact event, and wherein rearward angled portion is oriented at an angle 'α' relative to a horizontal, the angle 'α' tunable to further achieve the desired force-displacement femur load response; and wherein angle 'α' is between 45° and 75°.

In addition to the foregoing, the described tunable knee blocker energy absorption system may include one or more of the following features: wherein the left upper EA bracket includes a first end coupled to one end of the left lower EA bracket, and a second end coupled to an opposite end of the left lower EA bracket; wherein the left upper EA bracket further includes a main body having opposed sides with flanges extending outwardly therefrom, the flanges configured to provide structural rigidity and additional energy absorption capability, wherein the flanges include a tunable width to at least partially provide a desired force-displacement femur load response; wherein the left upper EA bracket main body includes one or more holes formed therein, wherein a size and shape of the one or more holes are tunable to further provide the desired force-displacement femur load response; wherein the left upper EA bracket is generally U-shaped and includes a forward longitudinal portion and a rearward angled portion connected by a lateral portion; and wherein a first corner radius is defined between the forward longitudinal portion and the lateral portion, a second corner radius is defined between the rearward angled portion and the lateral portion, and the lateral portion is rounded with a third radius, wherein the first and second corner radii and the third radius are tunable to at least partially provide a desired force-displacement femur load response.

In addition to the foregoing, the described tunable knee blocker energy absorption system may include one or more of the following features: wherein the left EA bridge includes a first end configured to couple to the structural cross-car member, and a second end coupled to the left lower EA bracket; wherein the left EA bridge includes one or more holes formed therein, wherein a size and shape of the one or more holes are tunable to at least partially provide a desired force-displacement femur load response; and wherein the right lower EA bracket includes a first end configured to couple to the structural cross-car member, and a second end configured to couple to the right upper EA bracket, wherein the right upper EA bracket includes a first end coupled to the first end of the right lower EA bracket, and a second end coupled to the second end of the right lower EA bracket, and wherein the right lower EA bracket is configured to absorb impact energy from relatively smaller occupants, and the right upper EA bracket is configured to provide additional impact energy absorption for relatively larger occupants.

In accordance with another example aspect of the invention, a method of forming tunable a knee blocker energy absorption system for a vehicle having an instrument panel, a structural cross-car member, and an occupant protection device is provided. In one example, the tunable knee blocker energy absorption system includes a left energy absorption (EA) bracket configured to couple to the structural cross-car member and including a left lower EA bracket, a left upper EA bracket, and a left EA bridge. A right EA bracket is configured to couple to the structural cross-car member and includes a right lower EA bracket and a right upper EA bracket. The left EA bracket and the right EA bracket are distinct from each other to manage a non-uniform load path of occupant femurs into the instrument panel and alter the kinematic response of the occupant back to a uniform presentation to the occupant protection device. The method includes choosing a width of flanges extending outwardly from a main body of the left lower EA bracket to achieve a desired force-displacement femur load response, and choosing a size and shape of at least one hole formed in the main body to further achieve the desired force-displacement femur load response.

In addition to the foregoing, the described method may include one or more of the following features: choosing a width of second flanges extending outwardly from a main body of the left upper EA bracket to further achieve the desired force-displacement femur load response, and choosing a size and shape of at least one hole formed in the main body to further achieve the desired force-displacement femur load response; and choosing a first corner radius of the left lower EA bracket to further achieve the desired force-displacement femur load response, and choosing a second corner radius of the left lower EA bracket to further achieve the desired force-displacement femur load response.

Further areas of applicability of the teachings of the present application will become apparent from the detailed description, claims and the drawings. It should be understood that the detailed description, including disclosed embodiments and drawings referenced therein, are merely exemplary in nature intended for purposes of illustration only and are not intended to limit the scope of the present application, its application or uses. Thus, variations that do not depart from the gist of the present application are intended to be within the scope of the present application.

DESCRIPTION

Described herein are systems and methods for leg impact energy absorption during an impact event such as an IIHS small overlap, rigid barrier (SORB) event. Unique left femur and right femur energy absorption brackets are configured to manage a load path of occupant femurs into the instrument panel in a non-uniform manner to alter the kinematic response of the occupant back to a uniform presentation of the occupant to the instrument panel primary occupant protection device, for example, a driver airbag. The energy absorption brackets are structurally distinct from each other and highly tunable to achieve desired force-displacement femur load response through one or more design considerations.

Figure 1:
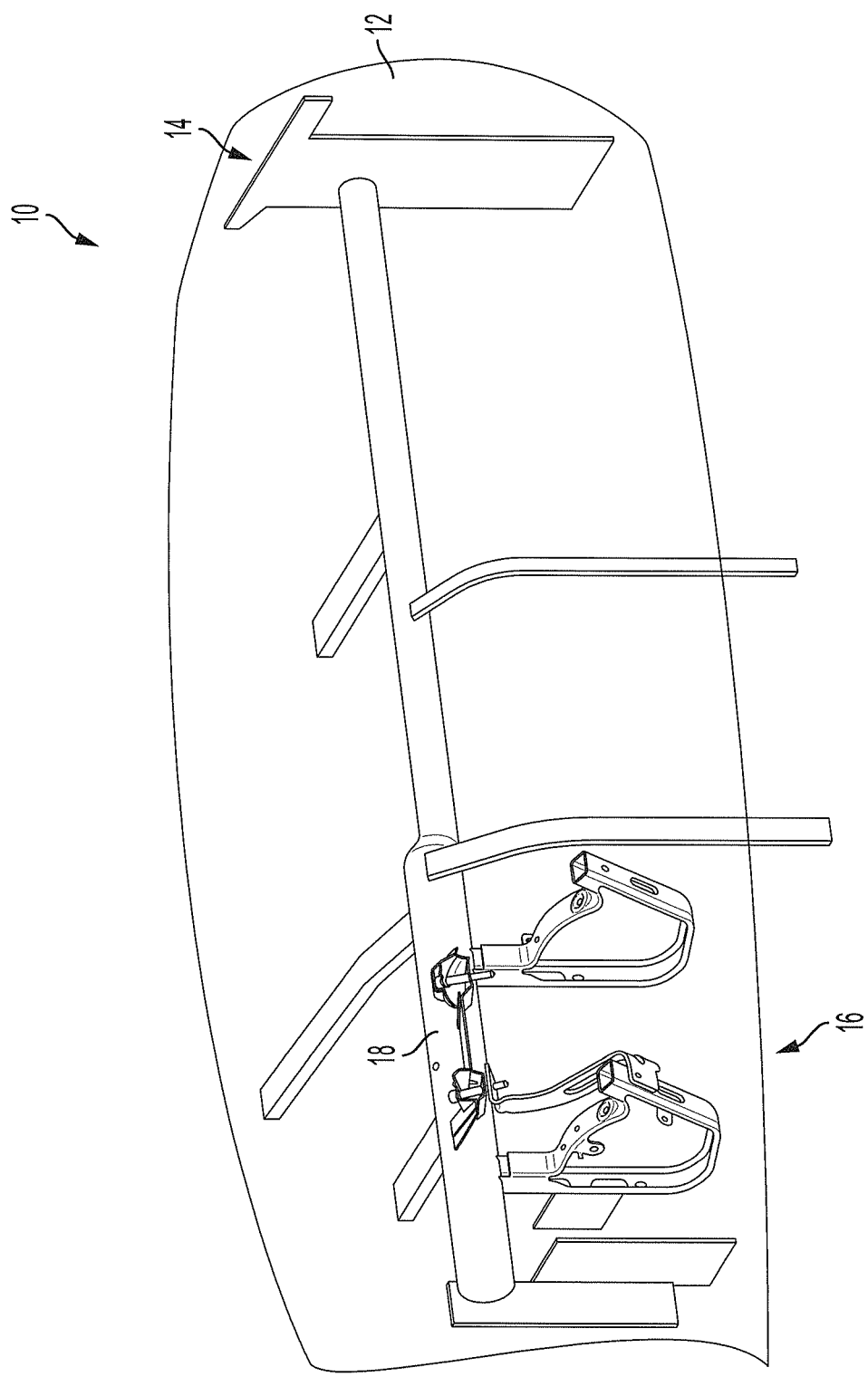
FIG. 1 is a perspective view of an example instrument panel with a knee blocker energy absorption system in accordance with the principles of the present application.

With reference to FIG. 1, an example vehicle instrument panel is generally shown and indicated at reference numeral 10. The instrument panel 10 generally includes an external cover layer 12 configured to conceal one or more vehicle structural or support members 14, a knee blocker energy absorption system 16, and additional components such as electronics, sound absorbing materials, a firewall, etc. (not shown). Although not illustrated, the instrument panel 10 is configured to receive a steering column assembly to facilitate steering the vehicle.

Figure 2:
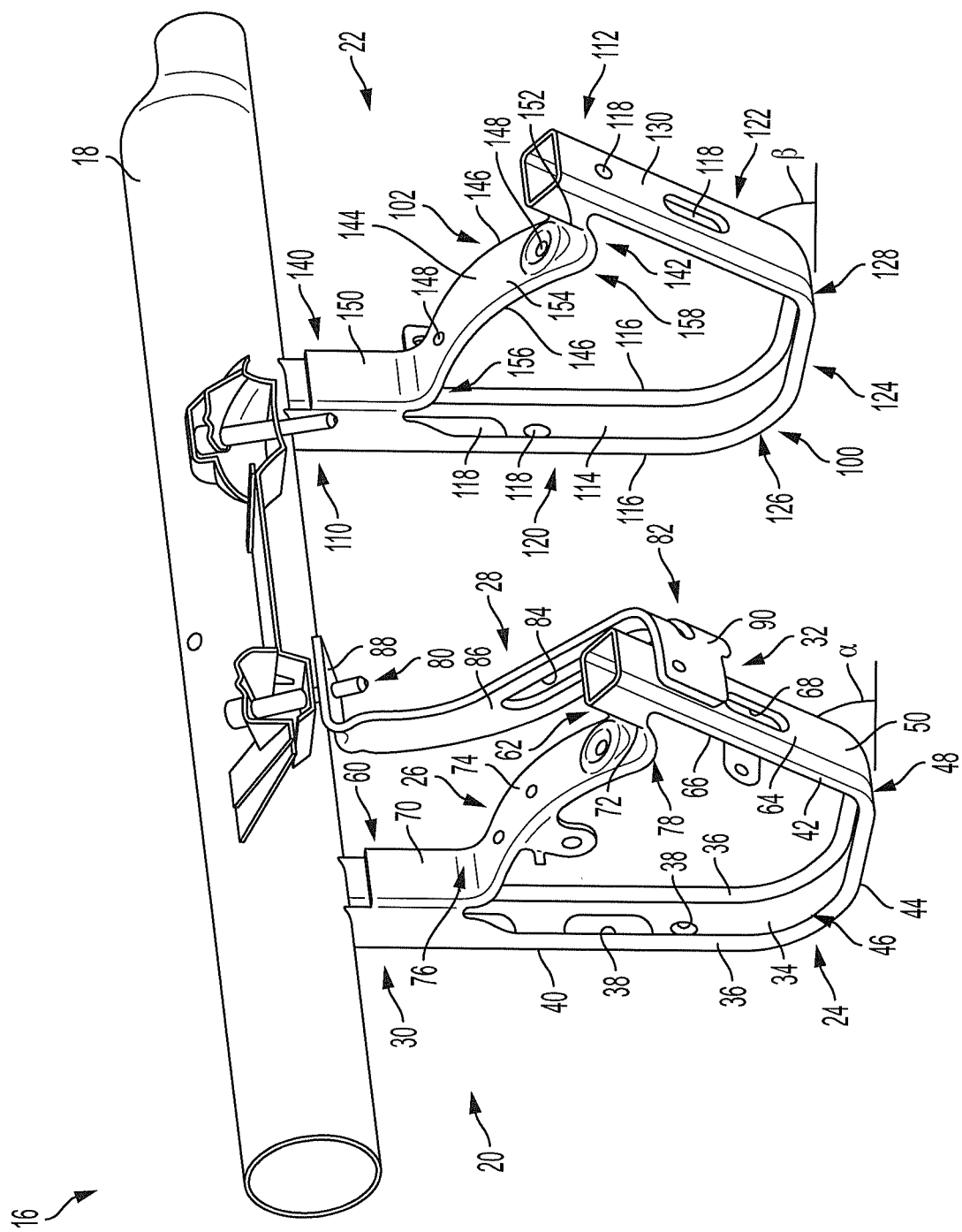
FIG. 2 is a perspective view of the example knee blocker energy absorption system shown in FIG. 1, in accordance with the principles of the present application.

With additional reference to FIG. 2, in the example embodiment, the knee blocker energy absorption system 16 is coupled to a cross-car beam 18 of the structural support members 14. The knee blocker energy absorption system 16 is a multi-piece energy absorbing system configured to provide unique vehicle impact responses for various occupant sizes (e.g., $5^{th}$, $50^{th}$, $95^{th}$ percentile occupants), particularly for frontal impact events including IIHS narrow offset and NHTSA oblique deformable barrier tests. For example, SORB testing inherently causes the occupant to pitch forward and outboard towards the instrument panel in a non-uniform manner. The knee blocker energy absorption system 16 is configured to return the occupant (e.g., driver) kinematics back to a uniform load path into the instrument panel 10 and airbag (not shown) to provide occupant protection during the impact event without compromising performance during other impact events.

In the example embodiment, the knee blocker energy absorption system 16 generally includes a left femur energy absorption (EA) bracket 20 and a right femur EA bracket 22 configured to facilitate occupant protection during frontal impacts such as, for example, those occurring during SORB testing. More specifically, the knee blocker energy absorption system 16 is configured to manage a non-uniform load path of occupant femurs into the instrument panel 10 and alter the kinematic response of the occupant back to a uniform presentation of the occupant to the instrument panel primary occupant protection device (e.g., airbag).

As illustrated in FIG. 2, in the example implementation, the left EA bracket 20 generally includes left lower EA bracket 24, a left upper EA bracket 26, and a left EA bridge 28. The right EA bracket 22 generally includes a right lower EA bracket 100 and a right upper EA bracket 102. As set forth in greater detail below, the left and right EA brackets 20, 22 are structurally different or distinct from one another such that each bracket is unique.

In the example embodiment, the left lower EA bracket 24 includes a first end 30 and an opposite second end 32. The first end 30 is coupled to the cross-car beam 18 (e.g., via welding), and the second end 32 is coupled to the left upper EA bracket 26 and/or left EA bridge 28 (e.g., via welding). In the illustrated example, the left lower EA bracket 24 generally includes a main body 34 with at least a portion having opposed sides with flanges 36 extending outwardly therefrom. In one example, the flanges 36 are oriented orthogonal to or substantially orthogonal to the main body 34 and are configured to provide structural rigidity and additional energy absorption capability to the left lower EA bracket 24. The flanges 36 have a tunable width (e.g., the distance extending from the main body 34) to achieve a desired force-displacement femur load response.

Additionally, one or more features 38 (e.g., holes, notches, initiators, or other formation) can be formed in the main body 34. The size and shape of the features 38 are tunable to achieve a desired force-displacement femur load response. For example, feature 38 may be generally oval-shaped hole having a major axis of between approximately 20.0 mm and approximately 40.0 mm or between 20.0 mm and 40.0 mm, and a minor axis of between approximately 8.0 mm and approximately 24.0 mm or between 8.0 mm and 24.0 mm. In another example, feature 38 has a major axis of 40.0 mm or approximately 40.0 mm, and a minor axis of 16.0 mm or approximately 16.0 mm.

In the illustrated example, the left lower EA bracket 24 is generally U-shaped and includes a forward longitudinal portion 40 and a rearward angled portion 42 connected by a lateral portion 44. A first corner radius 46 is defined between the forward longitudinal portion 40 and the lateral portion 44, and a second corner radius 48 is defined between the rearward angled portion 42 and the lateral portion 44. The corner radii 46, 48 are tunable to provide a desired force-displacement femur load response. Additionally, the rearward angled portion 42 defines a contact surface 50 configured to be contacted by the occupant's left knee during the impact event. The rearward angled portion 42 is oriented at an angle 'α' (relative to the horizontal), which is tunable to achieve a desired force-displacement femur load response. In one example, angle 'α' is between 0° and 90° or between approximately 0° and approximately 90° or any desired range therebetween. In another example, angle 'α' is between 45° and 75° or between approximately 45° and approximately 75°. In another example, angle 'α' is 58° or approximately 58°.

In the example embodiment, the left upper EA bracket 26 generally includes a first end 60 and an opposite second end 62. The first end 60 is coupled to the left lower EA bracket first end 30 (e.g., via welding) and the second end 62 is coupled to the left lower EA bracket second end 32 (e.g., via welding). In an alternative example, brackets 24, 26 are integrally formed as a single piece. At least a portion of the left upper EA bracket 26 includes a main body 64 having opposed sides with flanges 66 extending outwardly therefrom. In one example, flanges 66 are oriented orthogonal to or substantially orthogonal to the main body 64. The flanges 66 are configured to provide structural rigidity and additional energy absorption capability to the left upper EA bracket 26. The flanges 66 have a tunable width (e.g., the distance extending from the main body 64) to achieve a desired force-displacement femur load response. Additionally, one or more features 68 (e.g., holes, notches, initiators, or other formation) can be formed in the main body 64. The size and shape of the features 68 are tunable to achieve a desired force-displacement femur load response.

In the illustrated example, the left upper EA bracket 26 is generally U-shaped and includes a forward longitudinal portion 70 and a rearward angled portion 72 connected by a lateral portion 74. In the example embodiment, forward longitudinal portion 70 is coupled to and extends along the forward longitudinal portion 40, the rearward angled portion 72 is coupled to and extends along the rearward angled portion 42, and the lateral portion 74 is rounded with a predefined radius. A first corner radius 76 is defined between the forward longitudinal portion 70 and the lateral portion 74, and a second corner radius 78 is defined between the rearward angled portion 72 and the lateral portion 74. The predefined radius and corner radii 76, 78 are tunable to provide a desired force-displacement femur load response.

In the example embodiment, the left EA bridge 28 includes a first end 80 and an opposite second end 82. The first end 80 is coupled to the cross-car beam 18 (e.g., via welding, fastener, etc.), and the second end 82 is coupled to the left lower EA bracket 24 (e.g., via welding). In an alternative example, left EA bridge 28 may be integrally formed with bracket 24 and/or bracket 26. One or more features 84 can be formed in the main body 34. The size and shape of the features 84 are tunable to achieve a desired force-displacement femur load response.

In the illustrated example, the left EA bridge 28 includes a main body 86, an inboard extending flange 88, and an outboard extending flange 90. In one example, the inboard and outboard extending flanges 88, 90 extend in opposite directions. The inboard extending flange 88 is coupled to the cross-car beam 18, and the outboard extending flange 90 is coupled to the contact surface 50 of the rearward angled portion 42 (e.g., via welding, fastener, etc.).

In the example implementation, the left lower EA bracket 24 is configured to absorb impact energy from smaller occupants (e.g., $5^{th}$ and $50^{th}$ percentile), and the left upper EA bracket 26 is configured to provide additional energy absorption for larger occupants (e.g., $95^{th}$ percentile). Moreover, the left EA bridge 28 is configured to provide further energy absorption in addition to that provided by the left lower EA bracket 24 and left upper EA bracket 26. Moreover, features of the left EA bracket 20 are tunable such that the femur load of those occupants is within a predefined force-displacement corridor (i.e., between an upper corridor boundary and a lower corridor boundary defined on a x-y plot of displacement and force). This is particularly advantageous during SORB impact events to manage the load path of the occupant femurs into the instrument panel 10 in a non-uniform manner to alter the kinematic response of the occupant back to a uniform presentation of the occupant to the instrument panel 10 primary occupant protection device (e.g., airbag).

With continued reference to FIG. 2, in the illustrated example, the right EA bracket 22 generally includes the right lower EA bracket 100 and right upper EA bracket 102. The right lower EA bracket 100 includes a first end 110 and an opposite second end 112. The first end 110 is coupled to the cross-car beam 18 (e.g., via welding), and the second end 112 is coupled to the right upper EA bracket 102 (e.g., via welding). In the illustrated example, the right lower EA bracket 100 generally includes a main body 114 with at least a portion having opposed sides with flanges 116 extending outwardly therefrom. In one example, the flanges 116 are oriented orthogonal to or substantially orthogonal to the main body 114 and are configured to provide structural rigidity and additional energy absorption capability to the right lower EA bracket 100. The flanges 116 have a tunable width to achieve a desired force-displacement femur load response. Additionally, one or more features 118 (e.g., holes, notches, initiators, or other formation) can be formed in the main body 114, and the size and shape of the features 118 are tunable to achieve a desired force displacement femur load response.

In the example embodiment, the right lower EA bracket 100 is generally U-shaped and includes a forward longitudinal portion 120 and a rearward angled portion 122 connected by a lateral portion 124. A first corner radius 126 is defined between the forward longitudinal portion 120 and the lateral portion 124, and a second corner radius 128 is defined between the rearward angled portion 122 and the lateral portion 124. Corner radii 126, 128 are tunable to provide a desired force displacement femur load response. Further, the rearward angled portion 122 defines a contact surface 130 configured to be contacted by the occupant's right knee during the impact event. As shown, the rearward angled portion 122 is oriented at an angle β' (relative to the horizontal), which is tunable to achieve a desired force-displacement femur load response. In one example, angle 'β' is between 0° and 90° or between approximately 0° and approximately 90° or any desired range therebetween. In another example, angle 'β' is between 30° and 60° or between approximately 30° and approximately 60°. In another example, angle 'β' is between 45° and 75° or between approximately 45° and approximately 75°. In another example, angle 'β' is 58° or approximately 58°. In yet another example, angle 'β' is equal to or substantially equal to angle 'α'.

In the example embodiment, the right upper EA bracket 102 generally includes a first end 140 and an opposite second end 142. The first end 140 is coupled to the right lower EA bracket first end 110 (e.g., via welding) and the second end 142 is coupled to the right lower EA bracket second end 112 (e.g., via welding). In an alternative example, brackets 100, 102 are integrally formed as a single piece. At least a portion of the right upper EA bracket 102 includes a main body 144 having opposed sides with flanges 146 extending outwardly therefrom. In one example, flanges 146 are oriented orthogonal to or substantially orthogonal to the main body 144. The flanges 146 are configured to provide structural rigidity and additional energy absorption capability to the right upper EA bracket 102, and have a tunable width to achieve a desired force-displacement femur load response. Additionally, one or more features 148 (e.g., holes, notches, initiators, or other formation) can be formed in the main body 144 and the size and shape of the features 148 are tunable to achieve a desired force-displacement femur load response.

In the illustrated example, the right upper EA bracket 102 is generally U-shaped and includes a forward longitudinal portion 150 and a rearward angled portion 152 connected by a lateral portion 154. In the example embodiment, forward longitudinal portion 150 is coupled to and extends along the forward longitudinal portion 120, the rearward angled portion 152 is coupled to and extends along the rearward angled portion 122, and the lateral portion 154 is rounded with a predefined radius. A first corner radius 156 is defined between the forward longitudinal portion 150 and the lateral portion 154, and a second corner radius 158 is defined between the rearward angled portion 152 and the lateral portion 154. The predefined radius and the corner radii 156, 158 are tunable to provide a desired force-displacement femur load response.

In the example implementation, the right lower EA bracket 100 is configured to absorb impact energy from smaller occupants (e.g., $5^{th}$ and $50^{th}$ percentile), and the right upper EA bracket 102 is configured to provide additional energy absorption for larger occupants (e.g., $95^{th}$ percentile). Moreover, features of the right EA bracket 22 are tunable such that the femur load of those occupants is within a predefined force-displacement corridor (i.e., between an upper corridor boundary and a lower corridor boundary defined on a x-y plot of displacement and force). In additional embodiments, an EA bridge similar to left EA bridge 28 may be included to provide further energy absorption in addition to that provided by right lower EA bracket 100 and right upper EA bracket 102.

Described herein are systems and methods for knee/femur energy absorption during collision events. The system includes unique left and right knee/femur energy absorption brackets configured to manage the load path of the occupant femurs into an instrument panel in a non-uniform manner to alter the kinematic response of the occupant back to uniform presentation of the occupant to the instrument panel primary occupant protection device. The brackets are highly tunable to achieve desired force-displacement femur load response, through one or more of the following: material selection for the brackets, part gage, varying thicknesses (e.g., tailor rolled blank), flange width, corner radii, center reinforcement bracket modifications, notches or initiators, small design modifications, lateral spacing between EA brackets with respect to driver knee impact locations, and vertical spacing for center reinforcement bracket with respect to driver knee impact locations.

As such, the systems advantageously enable the vehicle and occupant to meet all front impact test modes, provide a stable EA response throughout frontal type impact events, provide desirable left leg injury metrics for the driver, provide desired interaction between the driver's knee and knee blocker panel assembly, provide desired energy absorption efficiency of knee blocker systems (EA brackets and interior trim panel), facilitate managing occupant pitching by providing a non-uniform load between left femur to right femur, and facilitate the occupant upper torso kinematic response into the driver's primary airbag with uniform loading.

It will be understood that the mixing and matching of features, elements, methodologies, systems and/or functions between various examples may be expressly contemplated herein so that one skilled in the art will appreciate from the present teachings that features, elements, systems and/or functions of one example may be incorporated into another example as appropriate, unless described otherwise above. It will also be understood that the description, including disclosed examples and drawings, is merely exemplary in nature intended for purposes of illustration only and is not intended to limit the scope of the present disclosure, its application or uses. Thus, variations that do not depart from the gist of the present disclosure are intended to be within the scope of the present disclosure.

What is claimed is:

1. A tunable knee blocker energy absorption system for a vehicle having an instrument panel, a structural cross-car member, and an occupant protection device, the tunable knee blocker energy absorption system comprising:
    a left energy absorption (EA) bracket configured to couple to the structural cross-car member and including a left lower EA bracket, a left upper EA bracket, and a left EA bridge; and
    a right EA bracket spaced apart from the left EA bracket and configured to couple to the structural cross-car member and including a right lower EA bracket and a right upper EA bracket,
    wherein the left EA bracket and the right EA bracket are structurally distinct from each other to manage a non-uniform load path of femurs of an occupant into the instrument panel and alter a kinematic response of the occupant back to a uniform presentation to the occupant protection device, and
    wherein the left lower EA bracket includes a first end configured to couple to the structural cross-car member, and a second end coupled to the left upper EA bracket and the left EA bridge.

2. The system of claim 1, wherein the left lower EA bracket further includes a main body having opposed sides with flanges extending outwardly therefrom, the flanges configured to provide structural rigidity and additional energy absorption capability, wherein the flanges include a tunable width to at least partially provide a desired force-displacement femur load response.

3. The system of claim 2, wherein the left lower EA bracket main body includes one or more holes formed therein, wherein a size and shape of the one or more holes are tunable to further provide the desired force-displacement femur load response,
    wherein at least one of the one or more holes is a generally oval-shaped hole having a major axis of between approximately 20 mm and approximately 40 mm.

4. The system of claim 1, wherein the left lower EA bracket is generally U-shaped and includes a forward longitudinal portion and a rearward angled portion connected by a lateral portion.

5. The system of claim 4, wherein a first corner radius is defined between the forward longitudinal portion and the lateral portion, and a second corner radius is defined between the rearward angled portion and the lateral portion,
wherein the first and second corner radii are tunable to at least partially provide a desired force-displacement femur load response.

6. The system of claim 5, wherein the rearward angled portion defines a contact surface configured to be contacted by the occupant's left knee during an impact event, and
wherein the rearward angled portion is oriented at an angle 'α' relative to a horizontal line, the angle 'α' tunable to further achieve the desired force-displacement femur load response.

7. The system of claim 6, wherein angle 'α' is between 45° and 75°.

8. The system of claim 1, wherein the left upper EA bracket includes a first end coupled to the first end of the left lower EA bracket, and a second end coupled to the opposite second end of the left lower EA bracket.

9. The system of claim 8, wherein the left upper EA bracket further includes a main body having opposed sides with flanges extending outwardly therefrom, the flanges configured to provide structural rigidity and additional energy absorption capability, wherein the flanges include a tunable width to at least partially provide a desired force-displacement femur load response.

10. The system of claim 9, wherein the left upper EA bracket main body includes one or more holes formed therein, wherein a size and shape of the one or more holes are tunable to further provide the desired force-displacement femur load response.

11. The system of claim 8, wherein the left upper EA bracket is generally U-shaped and includes a forward longitudinal portion and a rearward angled portion connected by a lateral portion.

12. The system of claim 11, wherein a first corner radius is defined between the forward longitudinal portion and the lateral portion, a second corner radius is defined between the rearward angled portion and the lateral portion, and the lateral portion is rounded with a third radius,
wherein the first and second corner radii and the third radius are tunable to at least partially provide a desired force-displacement femur load response.

13. The system of claim 1, wherein the left EA bridge includes a first end with an inboard extending flange configured to couple to the structural cross-car member, and a second end with an outboard extending flange coupled to the second end of the left lower EA bracket.

14. The system of claim 13, wherein the left EA bridge includes one or more holes formed therein, wherein a size and shape of the one or more holes are tunable to at least partially provide a desired force-displacement femur load response.

15. The system of claim 1, wherein the right lower EA bracket includes a first end configured to couple to the structural cross-car member, and a second end configured to couple to the right upper EA bracket,
wherein the right upper EA bracket includes a first end coupled to the first end of the right lower EA bracket, and a second end coupled to the second end of the right lower EA bracket, and
wherein the right lower EA bracket is configured to absorb impact energy from relatively smaller occupants, and the right upper EA bracket is configured to provide additional impact energy absorption for relatively larger occupants.

16. A method of forming a tunable knee blocker energy absorption system for a vehicle having an instrument panel, a structural cross-car member, and an occupant protection device, the tunable knee blocker energy absorption system including:
a left energy absorption (EA) bracket configured to couple to the structural cross-car member and including a left lower EA bracket, a left upper EA bracket, and a left EA bridge; and
a right EA bracket configured to couple to the structural cross-car member and including a right lower EA bracket and a right upper EA bracket,
wherein the left EA bracket and the right EA bracket are structurally distinct from each other to manage a non-uniform load path of femurs of an occupant into the instrument panel and alter a kinematic response of the occupant back to a uniform presentation to the occupant protection device,
wherein the left lower EA bracket includes a first end configured to couple to the structural cross-car member, and a second end coupled to the left upper EA bracket and the left EA bridge, the method comprising:
choosing a width of flanges extending outwardly from a main body of the left lower EA bracket to achieve a desired force-displacement femur load response; and
choosing a size and shape of at least one hole formed in the main body to further achieve the desired force-displacement femur load response.

17. The method of claim 16, further comprising:
choosing a width of second flanges extending outwardly from a main body of the left upper EA bracket to further achieve the desired force-displacement femur load response; and
choosing a size and shape of at least one hole formed in the main body of the left upper EA bracket to further achieve the desired force-displacement femur load response.

18. The method of claim 16, further comprising:
choosing a first corner radius of the left lower EA bracket to further achieve the desired force-displacement femur load response; and
choosing a second corner radius of the left lower EA bracket to further achieve the desired force-displacement femur load response.

* * * * *